(12) United States Patent
Burckhartzmeyer et al.

(10) Patent No.: US 6,237,952 B1
(45) Date of Patent: May 29, 2001

(54) ROLLOVER PROTECTIVE STRUCTURE FOR A MOBILE MACHINE

(75) Inventors: Jerry J. Burckhartzmeyer, Peoria, IL (US); John Reid, Dumfries (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/159,368

(22) Filed: Sep. 23, 1998

(51) Int. Cl.$^7$ .................................................. B60R 21/13
(52) U.S. Cl. ............................................................ 280/756
(58) Field of Search ........................ 280/756; 403/409.1, 403/374.1, 374.3

(56) References Cited

U.S. PATENT DOCUMENTS

| | | | |
|---|---|---|---|
| 2,463,124 | * 3/1949 | Sims | 287/119 |
| 3,528,691 | * 9/1970 | Matich | 287/52.05 |
| 3,563,401 | * 2/1971 | Gandolfo | 214/672 |
| 3,754,315 | * 8/1973 | Heitman | 29/400 |
| 3,791,668 | 2/1974 | Adams | 280/150 C |
| 3,971,186 | * 7/1976 | Havelka et al. | 52/753 |
| 3,976,323 | 8/1976 | Godfrey | 296/102 |
| 3,990,738 | 11/1976 | Kolinger et al. | 296/35 R |
| 4,032,187 | 6/1977 | Atherton | 296/102 |
| 4,050,735 | 9/1977 | Molnar | 296/102 |
| 4,062,420 | 12/1977 | Stedman | 180/89.1 |
| 4,077,655 | 3/1978 | Skahill | 280/756 |
| 4,078,276 | * 3/1978 | Nunes | 16/130 |
| 4,116,412 | 9/1978 | Walden | 248/358 |
| 5,042,835 | 8/1991 | Burns | 280/756 |
| 5,253,963 | * 10/1993 | Ries | 411/75 |
| 5,280,955 | 1/1994 | Nelson et al. | 280/756 |
| 5,477,747 | * 12/1995 | Cheng | 74/551.1 |
| 5,586,784 | 12/1996 | Mast et al. | 280/756 |
| 5,636,867 | 6/1997 | McNabb et al. | 280/756 |
| 5,785,461 | * 7/1998 | Lambert | 403/405 |

\* cited by examiner

*Primary Examiner*—Brian L. Johnson
*Assistant Examiner*—Tony Winner
(74) *Attorney, Agent, or Firm*—Steve D. Lundquist

(57) ABSTRACT

A rollover protective structure for a mobile machine. The structure includes a base member, a plurality of lower post portions attached to the base member, and a plurality of upper post portions, each associated with a corresponding lower post portion. Each corresponding upper and lower post portion includes either a tapered portion extending out from an end or a hollow portion to receive the tapered portion. Each post portion having the hollow portion also includes a pair of inclined wedges attached to opposing sides of the post portion. The structure also includes a canopy attached to the upper post portions.

6 Claims, 3 Drawing Sheets

ROLLOVER PROTECTIVE STRUCTURE FOR A MOBILE MACHINE

TECHNICAL FIELD

This invention relates generally to a rollover protective structure for a mobile machine and, more particularly, to an apparatus for attaching an upper portion of a rollover protective structure to a lower portion.

BACKGROUND ART

Mobile machines, in particular mobile work machines such as wheel loaders, tractors, graders, scrapers, and the like, commonly utilize operator cabs as rollover protective structures (ROPS) to protect an operator as work is being performed by the mobile machine. For example, in U.S. Pat. No. 5,636,867, McNabb et al. (McNabb) disclose a rollover protective structure and method having cross members and reinforcing members attached to four upright posts.

However, it is often desired to transport a mobile machine to a work site by carrying the mobile machine on the bed of a truck. A large mobile machine may not provide enough clearance for transport with a ROPS attached. The structure disclosed by McNabb is not designed to be readily removable and is therefore not suitable for use in transport applications.

In U.S. Pat. No. 3,976,323, issued to Godfrey, a cab mounting structure is disclosed which uses removably positionable pins to attach and remove a ROPS from a mobile work machine. However, the pins are difficult to access, the mounting hardware has numerous pieces and is complicated to assemble, and the process of installation and removal of the ROPS is therefore difficult and time consuming. In an application where quick and simple installation and removal of a ROPS is required, e.g., under adverse work conditions, a simpler and more efficient removal apparatus is required.

In U.S. Pat. No. 5,042,835, a rollover protection apparatus is disclosed by Burns which uses a roll bar assembly which may be readily moved to a desired position, then locked into place. However, situations may exist where a roll bar assembly such as disclosed by Burns is not adequate for the environment in which the operator and the mobile machine are working. For example, a mobile work machine may be used in an environment where much dust is present, thus requiring a more complete protective enclosure for an operator, such as an enclosed cab.

The present invention is directed to overcoming one or more of the problems as set forth above.

DISCLOSURE OF THE INVENTION

In one aspect of the present invention a rollover protective structure for a mobile machine is disclosed. The structure includes a base member, a plurality of lower post portions attached to the base member, and a plurality of upper post portions, each associated with a corresponding lower post portion. Each corresponding upper and lower post portion includes either a tapered portion extending out from an end or a hollow portion to receive the tapered portion. Each post portion having the hollow portion also includes a pair of inclined wedges attached to opposing sides of the post portion. The structure also includes a canopy attached to the upper post portions.

In another aspect of the present invention an apparatus for attaching an upper portion of a rollover protective structure to a lower portion includes a plurality of lower post portions and a plurality of upper post portions. Each corresponding upper and lower post portion has either a tapered portion or a hollow portion. The apparatus also includes a plurality of inclined wedges, one of each pair of wedges being attached to an opposing side of each of the post portions having the hollow portion. The upper post portion is connectable to the lower post portion with a bolt assembly inserted through a hole through the wedges, the upper post portion, and the lower post portion.

BEST MODE FOR CARRYING OUT THE INVENTION

Figure 1:
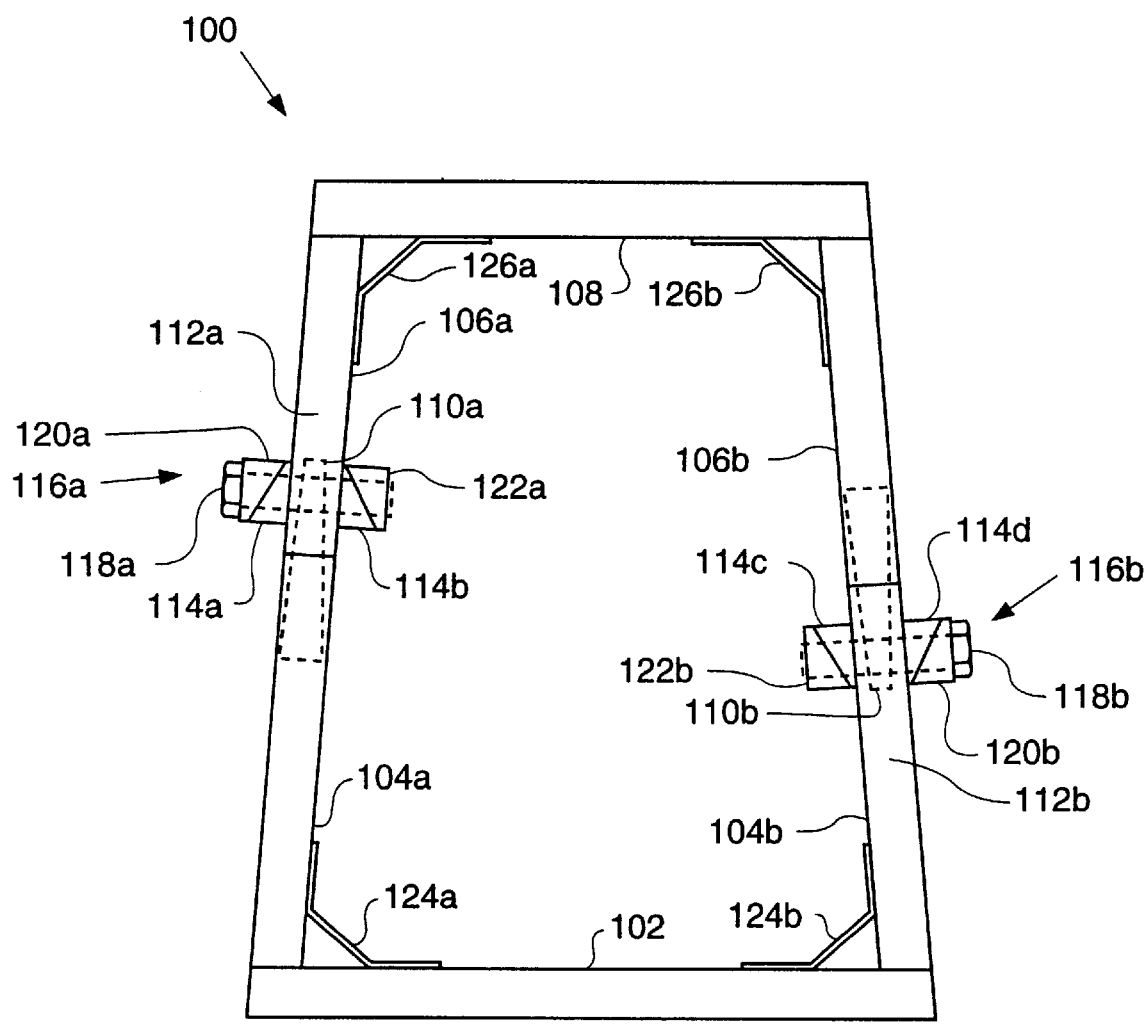
FIG. 1 is a diagrammatic illustration of a rollover protective structure as embodied in the present invention.

Referring to the drawings and, with particular reference to FIG. 1, a rollover protective structure (ROPS) 100 for a mobile machine is shown. Mobile machines, such as wheel loaders, tractors, dozers, graders, scrapers, and the like, are often used in environments that are rugged or harsh. For example, in mining or construction environments mobile machines often are required to navigate difficult terrain, and the need to provide a protective structure around an operator is increased as the possibility of a rollover increases.

The ROPS 100 is mounted on a base member 102. In one embodiment, the base member 102 is an integral part of the mobile machine. However, in another embodiment, the base member 102 is rigidly attached to the mobile machine, by means such as welding or bolts.

A plurality of lower post portions 104 are rigidly attached to the base member 102 at a first end of the lower post portions 104. The lower post portions 104 extend essentially in an upward direction from the base member 102. FIG. 1 shows two lower post portions 104a,b. However, in the preferred embodiment, four lower post portions 104 are rigidly attached to four corners of the base member 102. It is understood, however, that any number of lower post portions 104 may be used, for example, two, six or eight, without deviating from the spirit of the invention.

Between each lower post portion 104 and the base member 102, a lower reinforcing support 124 is rigidly attached. FIG. 1 illustrates a lower reinforcing support 124a connected from lower post portion 104a to the base member 102, and lower reinforcing support 124b connected from lower post portion 104b to the base member 102. In addition, each and every other lower post portion 104 will preferably have a lower reinforcing support 124 attached from the lower post portion 104 to the base member 102. Furthermore, each lower post portion 104 may have more than one lower reinforcing support 124 attached. For example, a lower post portion 104 may have lower reinforcing supports 124 attached on two sides.

The lower reinforcing supports 124a,b shown in FIG. 1 are depicted as angle iron bent to attach flush to the lower post portions 104a,b and to the base member 102, preferably by welding. The lower reinforcing supports 124a,b also bridge between the lower post portions 104a,b and the base member 102. This configuration greatly reduces leaning movement of the lower post portions 104a,b relative to the base member 102, thus increasing the strength and stability of the ROPS 100. However, the configuration of the lower reinforcing supports 124 may be of other designs suitable for the same purpose.

The portion of the ROPS 100 described above, i.e., the base member 102, the lower post portions 104, and the lower reinforcing supports 124, are, in the preferred embodiment, securely and rigidly attached to the mobile machine and are not designed for removal. An advantage to this arrangement is that, for reasons explained below, the top portion of the ROPS 100 is designed to be quickly and easily removed and installed, while the lower portion, which contains most of the operator cab controls, wiring, and seats, remains intact, thus eliminating the need for extensive disconnections, reconnections, and readjustments.

Associated with each lower post portion 104 is a corresponding upper post portion 106. For example, as shown in FIG. 1, lower post portion 104a is associated with upper post portion 106a, and lower post portion 104b is associated with upper post portion 106b.

Each corresponding upper and lower post portion 106,104 includes a tapered portion 110, which extends outwardly from one of either the upper post portion 106 or the lower post portion 104. The other of the upper post portion 106 or the lower post portion 104 has a hollow portion 112 adapted to receive the tapered portion 110. For example, in FIG. 1, the lower post portion 104a includes a tapered portion 110a extending upward, while the upper post portion 106a has a hollow portion 112a to receive the tapered portion 110a. In like manner, the lower post portion 104b has a hollow portion 112b to receive a tapered portion 110b, which is attached to, and extends downward from, the upper post portion 106b.

The location of the tapered portion 110 with either the upper post portion 106 or the lower post portion 104 may be chosen for a variety of reasons. For example, the design of the ROPS 100 may necessitate locating the tapered portions 110 in a certain manner. As another example, it may be desired to locate some tapered portions 110 with lower post portions 104 and other tapered portions 110 with upper post portions 106 to clearly indicate the orientation of the ROPS 100 during assembly. FIG. 1 shows for reasons of illustration only the lower post portion 104a having a tapered portion 110a, and the upper post portion 106b having a tapered portion 110b.

Each post portion 104,106 having a hollow portion 112 includes a pair of inclined wedges 114 rigidly attached to opposing sides of the post portion 104,106, preferably by welding. The inclined wedges 114 are inclined toward the post portion 104,106 in a direction away from the tapered portion 110 of the alternate post portion 106,104. For example, in FIG. 1, the upper post portion 106a includes a pair of inclined wedges 114a,b, and the lower post portion 104b includes a pair of inclined wedges 114c,d. The purpose of the inclined wedges 114 is described below.

Figure 2:
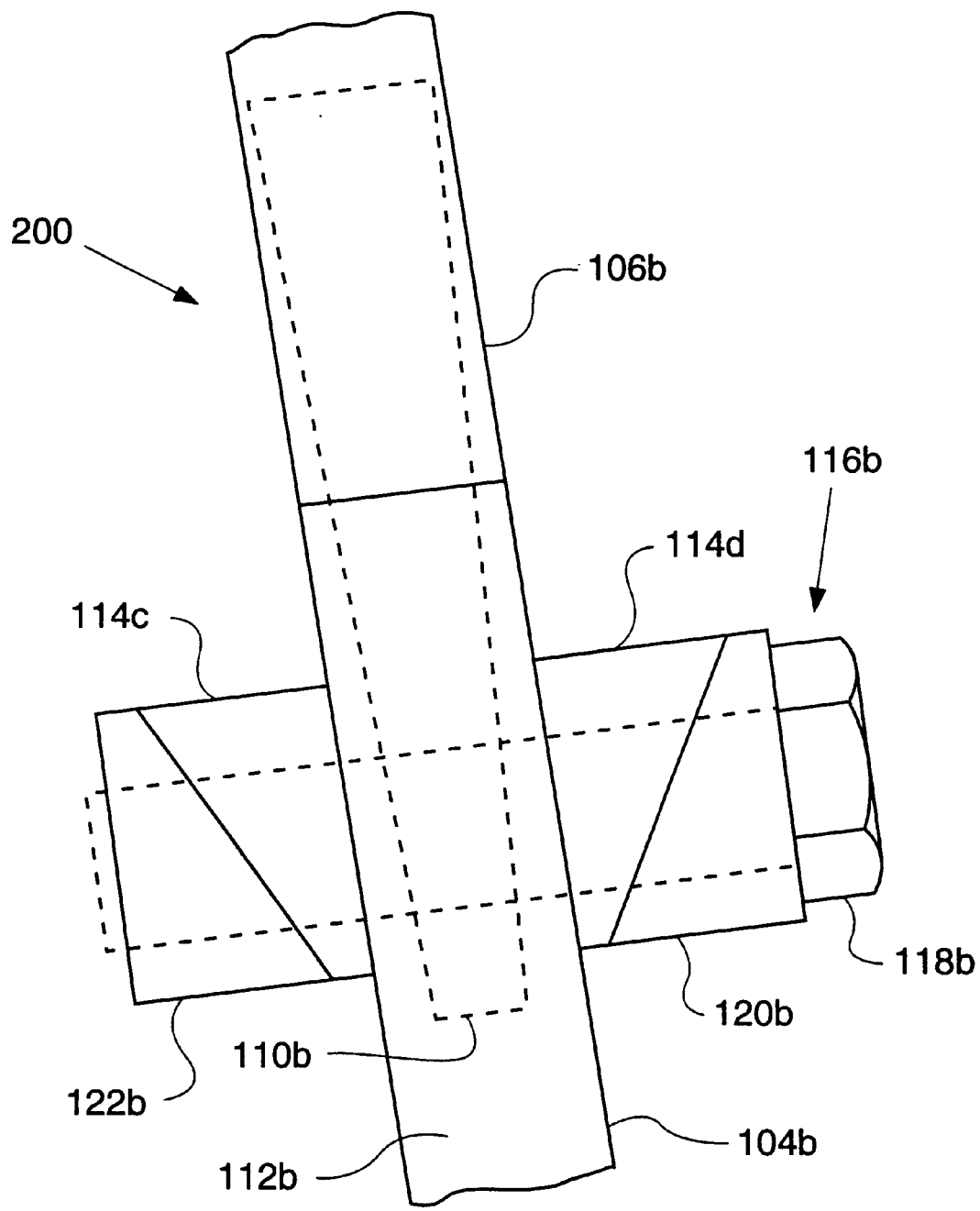
FIG. 2 is an enlarged view of a diagrammatic illustration of an apparatus for attaching an upper portion of a rollover protective structure to a lower portion.

Referring to FIG. 2 with continued reference to FIG. 1, an enlarged view of an apparatus 200 for attaching an upper portion of a ROPS to a lower portion, as embodied in a preferred aspect of the present invention is shown. For illustrative purposes, FIG. 2 is an enlarged view of the portion of FIG. 1 where the lower post portion 104b is connected to the upper post portion 106b.

A bolt assembly 116b includes, preferably, a threaded bolt 118b which extends through a common hole transverse the longitudinal direction of the upper and lower post portions 106b,104b when the tapered portion 110b is inserted into the hollow portion 112b. The bolt extends through the wedges 114c,d, the lower post portion 104b, and the tapered portion 110b. Preferably, the bolt assembly 116b includes an inclined washer 120b located at the inlet side of the common hole, the incline of the washer 120b matching the incline of the wedge 114d. The bolt assembly 116b also preferably includes an inclined threaded nut 122b located at the outlet side of the common hole, the incline of the nut 122b matching the incline of the wedge 114c.

In operation, as the bolt 118b is tightened, the inclined washer 120b and nut 122b are tightened against the wedges 114d,c. The force caused by this tightening causes the inclines of the washer 120b and nut 122b to attempt to slide along the inclines of the wedges 114d,c, thus exerting a downward force of the bolt 118b, which pulls the tapered portion 110b securely into the hollow portion 112b.

Referring back to FIG. 1, a canopy 108 is rigidly attached to the upper post portions 106 to provide a cover for the ROPS 100. Preferably, the canopy 108 is designed to provide protection to an operator within the ROPS 100, and is attached to the upper post portions 106 by welds, bolts, or some other secure means.

A plurality of upper reinforcing supports 126 are rigidly attached to the canopy 108 and to the upper post portions 106 in a manner similar to the lower reinforcing supports 124. The upper reinforcing supports 126 strengthen the upper portion of the ROPS 100 to minimize bending of the ROPS 100 due to side forces.

Figure 3:
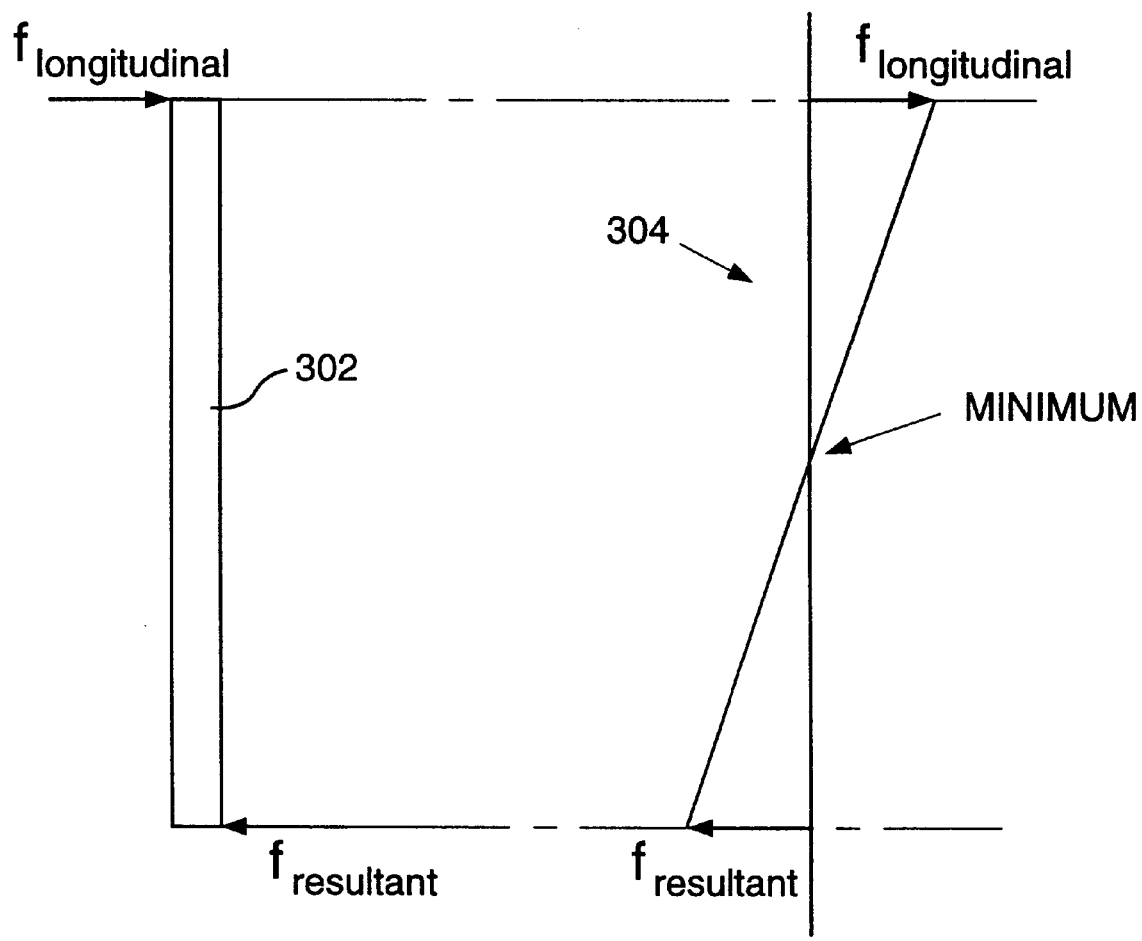
FIG. 3 is a diagrammatic illustration depicting the effects of side forces on a rollover protective structure.

As shown in FIG. 1, the ROPS 100 is assembled approximately midway along the height of the unit, i.e., the lower post portions 104 and the upper post portions 106 are dimensioned to connect at approximately the middle of the height of the ROPS 100. One advantage for this configuration is shown in FIG. 3, where a portion 302 of a ROPS post and a corresponding force diagram 304 is shown. During a rollover situation, a force $f_{longitudinal}$ is created at the top of the ROPS 100. A force $f_{resultant}$ is created at the bottom of the ROPS 100 in a direction opposite $f_{longitudinal}$. The resultant effects tend to a minimum at the center of the ROPS 100. Therefore, it is advantageous to locate the connection points of the upper and lower ROPS portions at the center.

Another advantage of locating the removable portion of the ROPS at the middle of the height of the unit is that, as described above, the cab controls and wiring are basically undisturbed when the unit is removed, thus simplifying removal and installation of the ROPS 100.

Industrial Applicability

As an example of the present invention in use, a mobile machine, such as a wheel loader, must be transported to a work site by hauling the wheel loader on a flatbed truck. The ROPS 100, although it is needed at the work site due to rugged terrain and conditions, must be removed for transport and later installed at the site. With the present invention, only three parts per post, a bolt, washer, and nut, must be removed from each post, and the upper ROPS may then be lifted from the wheel loader. At the work site, the upper ROPS is lowered back onto the wheel loader and the bolts, washers, and nuts are reinstalled.

Other aspects, objects, and features of the present invention can be obtained from a study of the drawings, the disclosure, and the appended claims.

What is claimed is:

1. A rollover protective structure for a mobile machine, comprising:
   a base member;
   a plurality of lower post portions rigidly attached to the base member at a first end and extending essentially in an upward direction from the base member;

a plurality of upper post portions, each upper post portion associated with a corresponding lower post portion, wherein the upper and lower post portions are dimensioned to connect together at approximately the middle of the height of the rollover protective structure, and wherein each corresponding upper and lower post portion includes:

a tapered portion extending outwardly from one of a second end of the lower post portion and a first end of the upper post portion, the other of the second end of the lower post portion and the first end of the upper post portion having a hollow portion adapted to receive the tapered portion; and a pair of inclined wedges, each wedge rigidly attached to an opposing side of the post portion having the hollow portion, wherein the wedges, the upper post portion, and the lower post portion have a common hole transverse the longitudinal direction of the upper and lower post portions when the tapered portion is inserted into the hollow portion; and a canopy rigidly attached to a plurality of second ends of the upper post portions.

2. A structure, as set forth in claim 1, wherein the upper post portion is connectable to the lower post portion with a bolt assembly, the bolt assembly including a threaded bolt inserted through the common hole, a washer at an inlet side of the hole, and a threaded nut at the outlet side of the hole, the washer and the threaded nut each having a surface inclined at an angle to match the inclined wedges.

3. A structure, as set forth in claim 1, further including a plurality of lower reinforcing supports, each lower support rigidly attached at a first end to the base member and at a second end to a corresponding lower post portion.

4. A structure, as set forth in claim 1, further including a plurality of upper reinforcing supports, each upper support rigidly attached at a first end to the canopy and at a second end to a corresponding upper post portion.

5. An apparatus for attaching an upper portion of a rollover protective structure to a lower portion, comprising:

a plurality of lower post portions, each lower post portion having a first end and a second end, the second end having one of a tapered portion and a hollow portion;

a plurality of upper post portions, each upper post portion having a first end and a second end, the first end having the other of the tapered portion and the hollow portion, wherein the upper and lower post portions are dimensioned to connect together at approximately the middle of the height of the rollover protective structure;

a plurality of inclined wedges, one of each pair of wedges rigidly attached to an opposing side of one of each of the post portions having the hollow portion, wherein the wedges, the upper post portion, and the lower post portion have a common hole transverse the longitudinal direction of the upper and lower post portions when the tapered portion is inserted into the hollow portion; and wherein each upper post portion is connectable to a corresponding lower post portion with a bolt assembly, the bolt assembly including a threaded bolt inserted through the common hole, a washer at an inlet side of the hole, and a threaded nut at the outlet side of the hole, the washer and the threaded nut each having a surface inclined at an angle to match the inclined wedges.

6. An apparatus, as set forth in claim 5, further including:

a base member, each of the lower post portions being rigidly attached at the first end to the base member; and a canopy, each of the upper post portions being rigidly attached at the second end to the canopy.

* * * * *